(12) United States Patent
Yang et al.

(10) Patent No.: US 9,411,909 B2
(45) Date of Patent: Aug. 9, 2016

(54) METHOD AND APPARATUS FOR PUSHING NETWORK INFORMATION

(71) Applicant: TENCENT TECHNOLOGY (SHENZHEN) COMPANY LIMITED, Shenzhen (CN)

(72) Inventors: Xiaorui Yang, Shenzhen (CN); Jinghui Xiao, Shenzhen (CN); Xiaobo Zhou, Shenzhen (CN); Tiange Si, Shenzhen (CN); Yuguo Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/424,407

(22) PCT Filed: Aug. 30, 2013

(86) PCT No.: PCT/CN2013/082689
§ 371 (c)(1),
(2) Date: Feb. 26, 2015

(87) PCT Pub. No.: WO2014/032614
PCT Pub. Date: Mar. 6, 2014

(65) Prior Publication Data
US 2015/0220660 A1   Aug. 6, 2015

(30) Foreign Application Priority Data

Sep. 3, 2012  (CN) .......................... 2012 1 0321780

(51) Int. Cl.
*G06N 3/08* (2006.01)
*G06F 17/30* (2006.01)
(52) U.S. Cl.
CPC .... *G06F 17/30991* (2013.01); *G06F 17/30867* (2013.01); *G06F 17/30876* (2013.01); *G06F 17/30946* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 7,260,568 B2 * | 8/2007 | Zhang | G06F 17/30663 707/711 |
| 8,494,897 B1 * | 7/2013 | Dawson | G06Q 10/10 705/14.42 |
| 2008/0154821 A1 * | 6/2008 | Poulin | G06Q 10/04 706/21 |
| 2009/0006974 A1 | 1/2009 | Harinarayan et al. | |
| 2009/0077495 A1 | 3/2009 | Bhat et al. | |
| 2009/0144451 A1 | 6/2009 | Cabezas et al. | |

(Continued)

FOREIGN PATENT DOCUMENTS

CN   201210279366 A  *  8/2012  ............. G06F 17/30

OTHER PUBLICATIONS

International Preliminary Report for International Application No. PCT/CN2013/082689, mailed Mar. 12, 2015, in 6 pages.
Extended European Search Report for European Patent Application No. 13833909.8, dated Aug. 8, 2015, in 8 pages.

(Continued)

*Primary Examiner* — Kakali Chaki
*Assistant Examiner* — Mai T Tran
(74) *Attorney, Agent, or Firm* — Knobbe Martens Olson & Bear LLP

(57) ABSTRACT

A method and apparatus for pushing network information are provided. The method includes: obtaining browser data uploaded by a browser; classifying the browser data uploaded via a classification model and determining a category of the browser data; obtaining network information related to the category, pushing the network information obtained to the browser.

10 Claims, 8 Drawing Sheets

(56) References Cited

U.S. PATENT DOCUMENTS

2009/0307210 A1* 12/2009 Ikeda ................ G06F 17/30719
2010/0082673 A1* 4/2010 Nakano ............... G06F 17/3089
 707/776
2011/0093415 A1 4/2011 Rhee et al.

OTHER PUBLICATIONS

International Search Report and Written Opinion of the International Searching Authority for International Application No. PCT/CN2013/082689, mailed on Dec. 12, 2013.

* cited by examiner

METHOD AND APPARATUS FOR PUSHING NETWORK INFORMATION

CROSS REFERENCE TO RELATED APPLICATIONS

This application is a U.S. National Phase application under 35 U.S.C. §371 of International Application No. PCT/CN2013/082689, filed Aug. 30, 2013, entitled "METHOD AND APPARATUS FOR PUSHING NETWORK INFORMATION", the entire contents of which are incorporated herein by reference.

FIELD OF THE INVENTION

The present invention relates to data processing technologies, more particularly to, a method and apparatus for pushing network information.

BACKGROUND OF THE INVENTION

Along with the developments of the Internet, network information spread via the Internet growth rapidly. It is more and more difficult for a user to obtain desired network information from a large number of network information. Therefore, network servers always push current popular network information, so that the user may obtain the current popular network information.

Generally, network information is provided via navigation pages, and the network information may be hot websites. Specifically, some hot websites are listed on the navigation page, and the user may select one of the hot websites listed on the navigation page, and then visit the hot website.

However, when the network information is pushed via the navigation page, the same network information is pushed to each user, and user's intention of the network information is not considered.

SUMMARY OF THE INVENTION

Embodiments of the present invention provide a method and apparatus for pushing network information, so as to consider the intention of the user when the network information is obtained and pushed.

A method for pushing network information includes:

obtaining, by a server, browser data uploaded by a browser;

classifying, by the server, the browser data uploaded via a classification model and determining a category of the browser data;

obtaining, by the server, network information related to the category, and pushing the network information obtained to the browser.

An apparatus for pushing network information includes:

a data obtaining module, to obtain browser data uploaded by a browser;

a classifying module, to classify the browser data uploaded via a classification model and obtain a category of the browser data; and a push module, to obtain network information related to the category, and push the network information obtained to the browser.

According to the method and apparatus for pushing the network information, browser data uploaded by a browser are obtained, the browser data uploaded are classified via a classification model and a category of the browser data is determined; network information related to the category is obtained and pushed to the browser. Since the browser data is generated when the user triggers various operations via the browser, the browser data reflects the intention of the user, so that the network information satisfying the intention of the user is obtained according to the browser data.

DETAILED DESCRIPTION OF THE INVENTION

Figure 1:
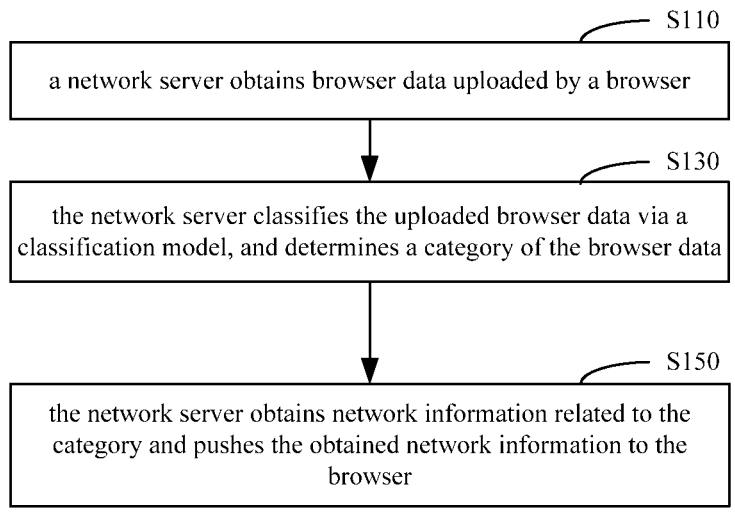
FIG. 1 is a schematic flowchart illustrating a method for pushing network information according to various examples of the present invention.

Example embodiments will now be described more fully with reference to the accompanying drawings.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

The description will be made as to the various embodiments in conjunction with the accompanying drawings in FIGS. 1-14. It should be understood that specific embodiments described herein are merely intended to explain the present disclosure, but not intended to limit the present disclosure. In accordance with the purposes of this disclosure, as embodied and broadly described herein, this disclosure, in one aspect, relates to method and apparatus for pushing network information.

Examples of mobile terminals that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to one skilled in the art.

FIG. 1 is a schematic flowchart illustrating a method for pushing network information according to various examples of the present invention. As shown in FIG. 1, the method includes the following processing.

At S110, a network server obtains browser data uploaded by a browser.

According to an example, the network server is taken as an example, and other servers may be applied for the method.

According to an example, the browser data is generated when the browser is running and is used to record information, e.g. browsing histories, download histories, buffer and etc. For example, the browser data may be a web page accessed by a user via the browser and an URL of the web page.

The browser collects the browser data generated when the browser is running, and uploads the collected browser data to the network server on a background via the Internet, and the browser data are stored in the network server.

At S130, the network server classifies the uploaded browser data via a classification model, and determines a category of the browser data.

The classification model is used to classify various uploaded browser data and determine the category of the browser data. For example, the uploaded browser data include a basketball web page accessed by a user and a URL of the basketball web page, and the category of the browser data is determined as a sport category by using the classification model. According to an example, the classification model is naive Bayesian classification model.

At S150, the network server obtains network information related to the category and pushes the obtained network information to the browser.

After determining the category of the uploaded browser data, the network server on the background obtains the network information related to the category and pushes the obtained network information to the browser, so that the user may scan the network information via the browser.

Since the network information is obtained according to the browser information generated when the browser is used by the user, the network information reflects the intention of the user, so that the network information obtained according to the browser information is close to and satisfy the intention of the user.

Figure 2:
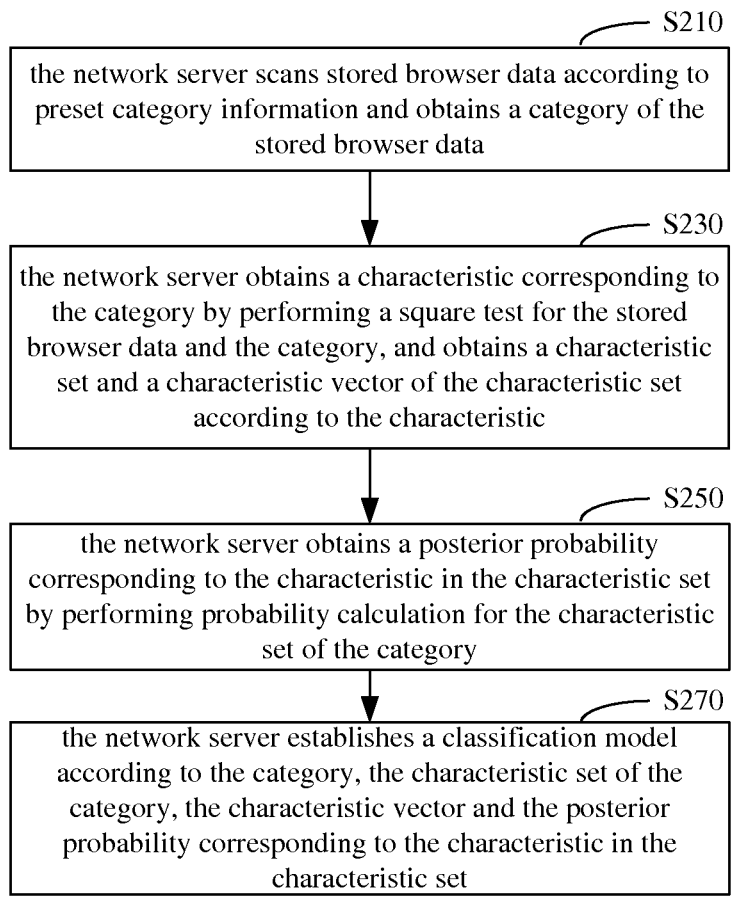
FIG. 2 is a schematic diagram illustrating a structure of an apparatus for pushing network information according to various examples of the present invention.

As shown in FIG. 2, in another example, the following processing is performed before the processing at S130 is performed.

At S210, the network server scans stored browser data according to preset category information and obtains a category of the stored browser data.

According to an example, the category information is to identify large numbers of browser data which are uploaded by the browser and stored in the network server. Specifically, the category information includes a keyword and a category of the keyword. The browser data stored in the network server are scanned, and it is determined whether the keyword in the category information is included in the stored browser data, if the keyword in the category information is included in the stored browser data, the category of the keyword is obtained, and the category of the scanned browser data is the category of the keyword.

The category of each item of browser data stored in the network server is determined, and a mapping relationship between the browser data and the categories is obtained.

Further, according to some examples, the stored browser data include accessed URLs, and the above processing at S210 includes: obtaining the URL recorded in the browser data, scanning the obtained URL, determining whether the keyword in the category information is included in the URL, if the keyword in the category information is included in the URL, obtaining the category of the keyword, and determining the category of the browser data as the category of the keyword.

According to an example, the browser data may be classified according to information recorded in the URL. For example, when the URL is "game.qq.com", the "game" field indicates that the web page is a web page of a game type. Hence, the category of the URL "game.qq.com" is determined according to the keyword of "game" and the category of "game". In this way, the large numbers of browser data stored in the network server are classified quickly and accurately according to the URLs and the category information.

At S230, the network server obtains a characteristic corresponding to the category by performing a square test for the stored browser data and the category, and obtains a characteristic set and a characteristic vector of the characteristic set according to the characteristic.

The square test, i.e. $x^2$ test, is used to check a correlation between the category and a certain word, so that a word having largest correlation with the category is taken as the characteristic of the category. The characteristic is a most representative word of the category. For example, for a category of "sport", a characteristic may be "basketball". The characteristic set consists of several characteristics obtained via the square test, and the characteristic vector of the characteristic set is obtained according the characteristic and the browser data belonging to the category.

According to another example, since there are large numbers of browser data stored in the network server which are uploaded during procedures of data interaction between various browsers and the network server, before the processing at S230 is performed, word segmentation is performed for the stored browser data to obtain several words and stopwords are removed from the obtained words.

According to an example, the word segmentation is performed for the browser data, the browser data are indicated as a word set, and stopwords are removed from the word set. Specifically, a stopword table may be configured in advance, and the words in the stopword table are removed from the word set. The stopwords include: English characters, numbers, math characters, punctuation and single Chinese character etc. For example, the single Chinese character of Chinese "de" and "le".

Figure 3:
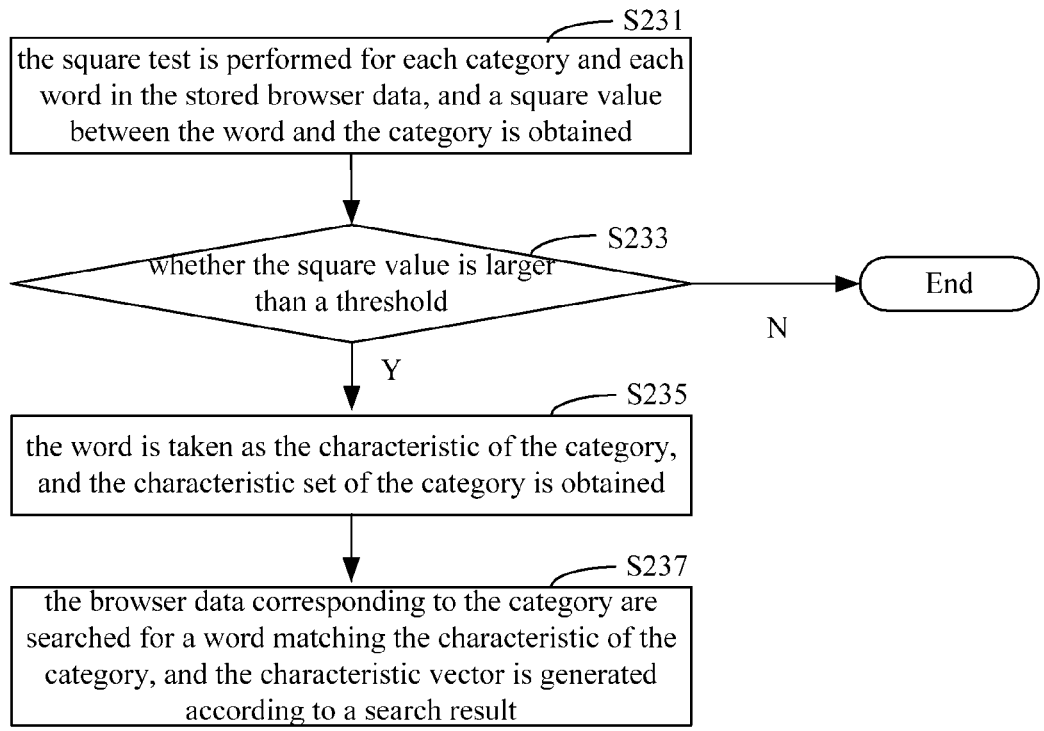
FIG. 3 is a schematic flowchart illustrating a procedure of obtaining a characteristic set of a category and a characteristic vector of the characteristic set according to various examples of the present invention.

As shown in FIG. 3, according to an example, the following processing is performed at S230.

At S231, the square test is performed for each category and each word in the stored browser data, and a square value between the word and the category is obtained.

According to an example, for each category, the square value between the category and each word in the stored browser data is calculated respectively. For example, the stored browser data includes N browser data items, and M browser data items are related to sport, and the word "basketball" is included in some of the browser data items, and the procedure of performing the square test for the "sport" and the "basketball" includes: determining the number of browser data items including "basketball" and belonging to the "sport" category in the stored browser data, and representing the determined number as A; determining the number of browser data items including "basketball" and not belonging to the "sport" category in the stored browser data, and representing the determined number as B; determining the number of browser data items not including "basketball" and belonging to the "sport" category in the stored browser data, and the representing the determined number as C; determining the number of browser data items not including "basketball" and not belonging to the "sport" category in the stored browser data, and representing the determined number as D, thus the square value between the category of "sport" and the "basketball" is $$\chi^2(\text{basketball, sport}) = \frac{(AD - BC)^2}{(A+B)(C+D)}$$

Similarly, the square value between each category and each word is obtained.

At S233, it is determined whether the square value is greater than a threshold, if the square value is greater than the threshold, processing at S235 is performed; if the square value is not greater than the threshold, the procedure is terminated.

According to the example, the square value indicates the correlation between the word and the category. For each word, if the correlation between the word and a certain category is larger, the category may be distinguished from other categories by using the word. Hence, the threshold is preconfigured and it is determined whether the square value is greater than the threshold. If the square value is greater than the threshold, the word is taken as the characteristic of the category; and if the square value is not greater than the threshold, the category cannot be distinguished from other categories by using the word, and the word is not taken as the characteristic of the category.

At S235, the word is taken as the characteristic of the category, and the characteristic set of the category is obtained.

According to an example, for a certain category, several words having the square value greater than the threshold are taken as the characteristics of the category, and the characteristic set consists of the several words.

At S237, the browser data corresponding to the category are searched for a word matching the characteristic of the category, and the characteristic vector is generated according to a search result.

According to an example, the browser data stored in the network server include several browser data items. The characteristics in the characteristic set are selected according the square value between the category and all of the words in the stored browser data, and each category only includes a certain number of browser data items, thus, for each category, the corresponding browser data item may not include all characteristics. Hence, after the characteristic set of each category is obtained, the browser data items corresponding to the category are searched for each characteristic, so that it is determined whether the characteristic is included in the browser data items corresponding to the category, and the characteristic vector corresponding to the characteristic set is obtained.

Figure 4:
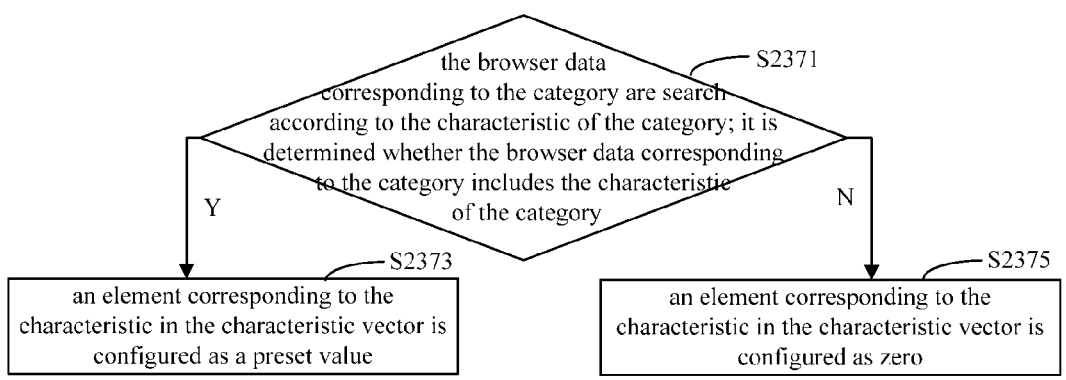
FIG. 4 is a schematic flowchart illustrating a procedure of generating a characteristic vector of a characteristic set according to various examples of the present invention.

As shown in FIG. 4, according to an example, the following processing is performed at S237.

At S2371, the browser data corresponding to the category are search according to the characteristic of the category; it is determined whether the browser data corresponding to the category includes the characteristic of the category, if the browser data corresponding to the category includes the characteristic of the category, the processing at 2373 is performed; otherwise, processing at 2375 is performed.

According to an example, the characteristic and the browser data corresponding to the category are obtained, and the browser data are searched for each characteristic to determine whether the characteristic is included in the browser data. If the characteristic is included in the browser data, an element corresponding to the characteristic in the characteristic vector is configured as a preset value, e.g. the preset value may be 1; otherwise, an element corresponding to the characteristic in the characteristic vector is configured as 0.

For example, the characteristic set of a certain category is obtained by using the square test, i.e. $T=\{t_1, t_2, \ldots t_m\}$, the characteristics of the characteristic set are composed of $t_1, t_2 \ldots t_m$. Each characteristic is searched in the browser data corresponding to the category, and it is determined that characteristic $t_2$ is not included in the browser data, accordingly, the characteristic vector of the category is $T_x=\{1, 0, \ldots, 1\}$.

At S2373, an element corresponding to the characteristic in the characteristic vector is configured as a preset value.

According to another example, after the processing at S2373 is performed, the method further includes the following processing. A weight of each characteristic in the characteristic set corresponding to the category is calculated, the preset value in the characteristic vector of the characteristic set is replaced with the weight of the characteristic.

According to an example, in the procedure of configuring the value of the element corresponding to the characteristic, each characteristic has the same weightiness in the procedure of classifying the browser data are the same. In some applications, the functions of different characteristics for distinguishing the category corresponding to the characteristic and other categories are different. The browser data may be classified by using only one certain characteristic, or may be classified by using several characteristics together. Hence, the weight of each characteristic is calculated to make the classification more accurate.

Specifically, a tfidf value of each characteristic is calculated according the browser data corresponding to the category by using TF-IDF algorithm, and a weight is assigned to each characteristic. The tfidf value is used to evaluate the importance of the characteristic for the browser data of the category, and the tfidf value is increased along with the increase of occurrence times of the characteristic in the browser data.

In the procedure of calculating the tfidf value for each characteristic of the category, firstly, a word frequency $tf_{ij}$ of the characteristic is calculated by using a formula $$tf_{ij} = \frac{n_{i,j}}{\sum_K n_{k,j}}.$$

The word frequency is a frequency of the characteristic occurring in the browser data stored in the network server, $n_{n,j}$ represents the number of the characteristic j included in the browser data corresponding to the category i, $n_{k,j}$ represents the number of the characteristic j included in the browser data corresponding to the category k, K represents the total number of the categories. An inverse document frequency $idf_i$, i.e. a reciprocal of a document frequency of the characteristic, is calculated by using a formula $$idf_i = \log\left(\frac{|D|}{|\{j: t_i \in d_j\}|}\right).$$

The document frequency is a ratio of the number of categories corresponding to the browser data including the characteristic to the total number of the categories; D represents the total number of the categories, $|\{j:t_i \in d_j\}|$ represents the number of categories corresponding to the browser data $t_i$ including the characteristic j; $d_j$ represents all browser data stored in the network server; finally, a product of the word frequency $tf_{ij}$ and the inverse document frequency $idf_i$ is calculated to obtain the $tfidf_{i,j}$ value of the characteristic, i.e. $tfidf_{i,j}=tf_{i,j} \times idf_i$.

At S2375, an element corresponding to the characteristic in the characteristic vector is configured as zero.

At S250, the network server obtains a posterior probability corresponding to the characteristic in the characteristic set by performing probability calculation for the characteristic set of the category.

According to an example, a prior probability and a conditional probability of the characteristic are calculated according to a naive Bayesian formula, and the posterior probability of the characteristic is obtained by multiplying the prior probability and the conditional probability. Specifically, the prior probability may be obtained according to a formula $$P(Y = c_k) = \frac{n_k}{\sum_k n_k},$$

$n_k$ represents the number of browser data items in the browser data corresponding to the category $c_k$, K represents the number of all categories, $k \in K$. Then the conditional probability of the characteristic $x^{(j)}$ may be obtained according to a formula $$P(X^{(j)} = x^{(j)} | Y = c_k) = \frac{n_{jk}}{\sum_K n_{jk}},$$

$n_{jk}$ represents the number of the characteristic $x^{(j)}$ included in the browser data corresponding to the category $c_k$. Finally the posterior probability of the characteristic is obtained by multiplying the prior probability and the conditional probability.

At S270, the network server establishes a classification model according to the category, the characteristic set of the category, the characteristic vector and the posterior probability corresponding to the characteristic in the characteristic set.

According to an example, for each category, the obtained characteristic set, the characteristic vector and the posterior probability corresponding to the characteristic in the characteristic set are stored and associated with the category to form the classifying model, and the browser data uploaded by the browser are classified accurately according to the classifying model.

Figure 5:
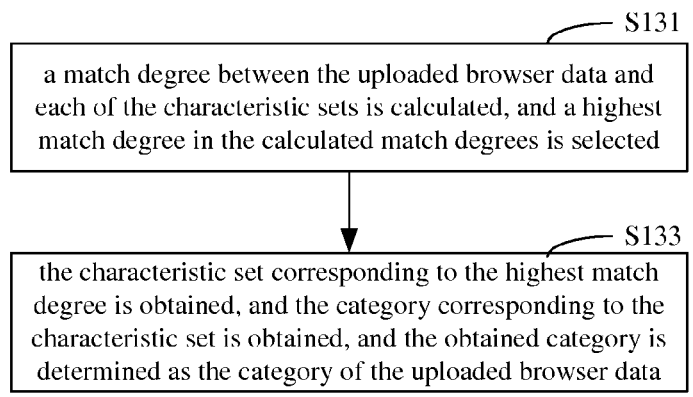
FIG. 5 is a schematic flowchart illustrating a procedure of obtaining a category of browser data according to various examples of the present invention.

As shown in FIG. 5, according to an example, the following processing is performed at S130.

At S131, a match degree between the uploaded browser data and each of the characteristic sets is calculated, and a highest match degree in the calculated match degrees is selected.

According to an example, the match degree is to indicate the degree of similarity between the uploaded browser data and the characteristic set of a certain category, when the match degree is higher, the possibility of that the uploaded browser data belongs to the category is higher.

Specifically, in the procedure of calculating the match degree between the uploaded browser data and the characteristic set, a word in the uploaded browser data is extracted. The extracted word is compared with the characteristics in each characteristic set to obtain the characteristics identical with the extracted word in each characteristic set, and then the matching degree between the uploaded browser data the characteristic set is obtained according to the weight and the posterior possibility corresponding the characteristic. Further the highest match degree is obtained. In this way, the most similar characteristic set of the uploaded browser data is obtained without a large number of complex calculations, thereby greatly reducing the resources burden for the numerous uploaded browser data.

For example, several words in the uploaded browser data are extracted, the extracted words are compared with the characteristics in each characteristic set to obtain the characteristics identical with the extracted word in each characteristic set. Then the product of the weight and the posterior possibility corresponding each of the obtained characteristics is calculated, and the multiple products are multiplied to obtain the matching degree between the uploaded browser data the characteristic set, and the highest match degree in the calculated match degrees are extracted.

At S133, the characteristic set corresponding to the highest match degree is obtained, and the category corresponding to the characteristic set is obtained, and the obtained category is determined as the category of the uploaded browser data.

According to an example, since the characteristic set corresponding to the highest match degree is most similar with the uploaded browser data, the category of the characteristic set is the category of the uploaded browser data.

According to another example, the following processing is performed before S133:

determining whether the highest match degree is greater than a match threshold, if the highest match degree is greater than the match threshold, processing at S133 is performed; if the highest match degree is not greater than a match threshold, the procedure is terminated.

According to the example, the characteristic set corresponding to the highest match degree is most similar with the uploaded browser data. In some situations, the classifying model cannot determine the category of the uploaded browser data. Therefore, after the highest match degree is obtained, it is determined whether the highest match degree is greater than the match threshold; if the highest match degree is greater than the match threshold, the category of the characteristic set corresponding to the highest match degree is the category of the uploaded browser data; if the highest match degree is not greater than the match threshold, it is indicated that the classifying model cannot determine the category of the uploaded browser data, thereby further improving the accuracy of the classification.

Figure 6:
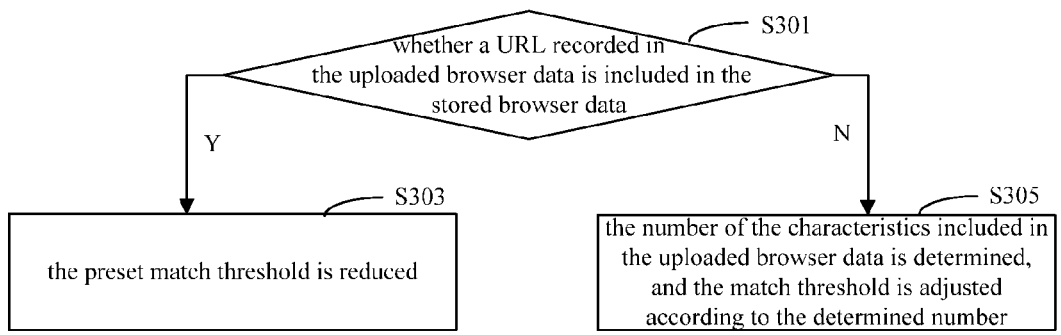
FIG. 6 is a schematic flowchart illustrating another procedure of obtaining a category of browser data according to various examples of the present invention.

As shown in FIG. 6, according to another example, processing at S301 is performed before determining whether the highest match degree is greater than the match threshold.

At S301, it is determined whether a URL recorded in the uploaded browser data is included in the stored browser data, if the URL recorded in the uploaded browser data is included in the stored browser data, processing at S303 is performed; otherwise, processing at S305 is performed.

According to an example, the match threshold may be adjusted according practical conditions to adapt the current classifying procedure. The URL is extracted from the uploaded browser data and it is determined whether the URL is included in the stored browser data. If the URL is included in the stored browser data, the possibility of identifying the uploaded browser data is respectively high, and thus the match threshold may be reduced; otherwise, the match threshold may be adjusted according the number of the characteristics included in the uploaded browser data, so that the match threshold may be used to classify various browser data, and the accuracy of the classification is improved.

At S303, the preset match threshold is reduced.

According to an example, the reduced match threshold is obtained according to $\theta=\theta/10$.

At S305, the number of the characteristics included in the uploaded browser data is determined, and the match threshold is adjusted according to the determined number.

According to an example, no matter whether the URL recorded in the uploaded browser data is included in the stored browser data, the number of the characteristics included in the uploaded browser data is considered to determine a reasonable match threshold and dynamically adjust the match threshold. The number of the characteristics which is included in both the characteristic set corresponding to the highest match degree and the uploaded browser data is determined, and the match threshold is adjusted according a formula $\theta=\theta/l*m$, l is an adjusting factor.

Figure 7:
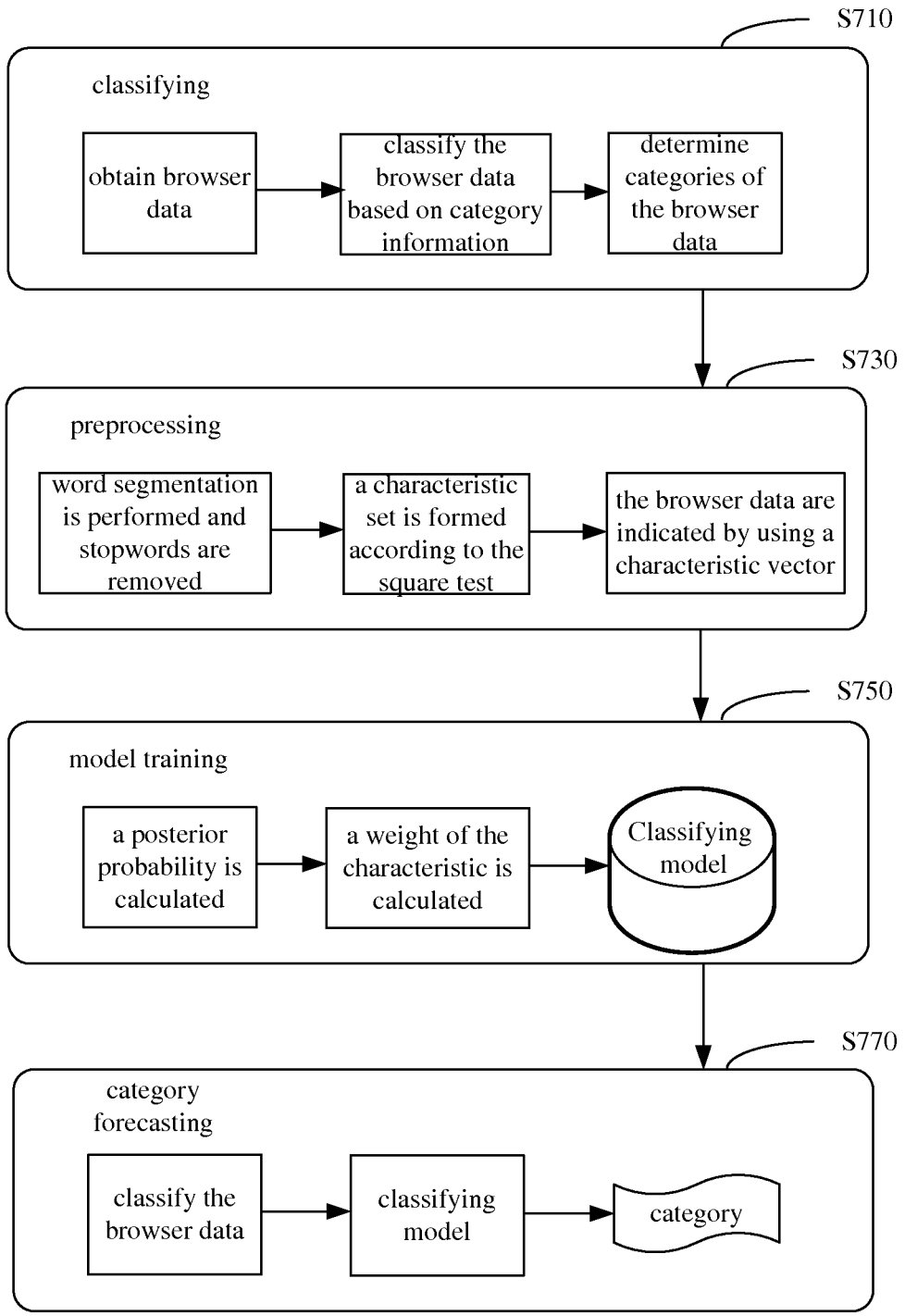
FIG. 7 is a schematic flowchart illustrating an application of a method for pushing network information according to various examples of the present invention.

The method for pushing the network information will be described in detailed hereinafter. As shown in FIG. 7, a classifying model is established via S710 to S770 according to browser data stored in a network server before classifying uploaded browser data and pushing network information.

In a classifying procedure shown at S710, browser data stored in the network server are obtained, and categories of the browser data are determined by scanning the browser data based on category information, and processing at S730 is performed.

In a preprocessing procedure shown at S730, word segmentation is performed for the stored browser data and stopwords are removed, a characteristic of each category is determined according to the square test, and a characteristic set corresponding to the category is formed. The browser data are indicated by using a characteristic vector corresponding to the characteristic set, and processing at S750 is performed.

In a model training procedure shown at S750, a prior probability, a conditional probability, a product of the prior probability and the conditional probability, and a weight of the characteristic are calculated to obtain a classifying model of the stored browser data, so as to forecast categories of uploaded browser data, and to obtained network information related to the category.

In a category forecasting procedure shown at S770, browser data uploaded by the browser is obtained, and the obtained browser data are input to the classifying model to obtain the categories of the browser data.

Figure 8:
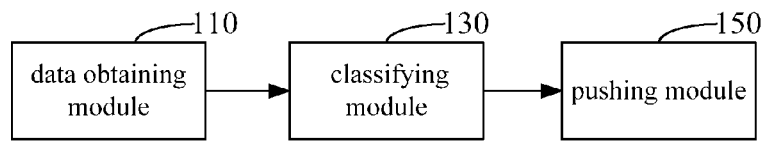
FIG. 8 is a schematic diagram illustrating an apparatus for pushing network information according to various examples of the present invention.

FIG. 8 is a diagram illustrating an apparatus for pushing network information according to an example of the present invention. As shown in FIG. 8, the apparatus includes a data obtaining module 110, a classifying module 130 and a pushing module 150.

The data obtaining module 110 is configured to obtain browser data uploaded by a browser.

According to an example, the browser data is generated when the browser is running and is used to record information, e.g. browsing histories, download histories, buffer and etc. For example, the browser data may be a web page accessed by a user via the browser and an URL of the web page.

The browser collects the browser data generated when the browser is running, and uploads the collected browser data to a network server on a background via the Internet. The data obtaining module 110 in the network server obtains and stores the uploaded browser data.

The classifying module 130 is configured to classify the browser data uploaded via a classification model and obtain a category of the browser data.

The classification model is used to classify various uploaded browser data and determine the category of the browser data. For example, the uploaded browser data are a basketball web page accessed by a user and a URL of the basketball web page, and the classifying module 130 determines that the category of the browser data is a sport category by using the classification model. According to an example, the classification model is naive Bayesian classification model.

The pushing module 150 is configured to obtain network information related to the category, and push the network information obtained to the browser.

After the network server determines the category of the uploaded browser data, the pushing module 150 obtains the network information related to the category and pushes the obtained network information to the browser, so that the user may scan the network information via the browser.

Since the network information is obtained according to the browser information generated when the browser is used by the user, the network information reflects the intention of the user, so that the network information obtained according to the browser information is close to the intention of the user, and the network information satisfying the intention of the user is provided.

Figure 9:
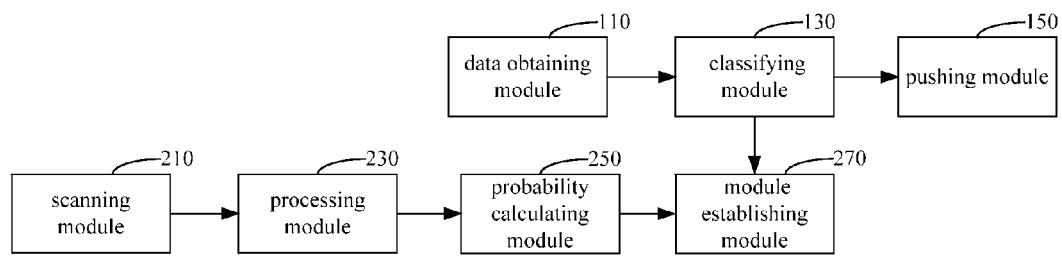
FIG. 9 is a schematic diagram illustrating an apparatus for pushing network information according to various examples of the present invention.

As shown in FIG. 9, according to another example, the apparatus for pushing network information further includes a scanning module 210, a processing module 230, a probability calculating module 250 and a module establishing module 270.

The scanning module 210 is configured to scan browser data stored according to preset category information and obtain a category of the browser data stored.

According to an example, the category information is to identify large numbers of browser data which are uploaded by the browser and stored in the network server. Specifically, the category information includes a keyword and a category of the keyword. The scanning module 210 scans the browser data stored in the network server, determines whether the keyword in the category information is included in the stored browser data. If the keyword in the category information is included in the stored browser data, the scanning module 210 obtains the category of the keyword and determines the category of the scanned browser data as the category of the keyword.

The scanning module 210 determines the categories of the browser data stored in the network server, and obtains a mapping relationship between the browser data and the categories.

Further, according to some examples, the stored browser data include accessed URLs, the scanning module 210 obtains the URL recorded in the browser data, scans the obtained URL, determines whether the keyword in the category information is included in the URL, if the keyword in the category information is included in the URL, obtains the category of the keyword, and determines the category of the browser data as the category of the keyword.

According to an example, the browser data may be classified according to information recorded in the URL. For example, when the URL is "game.qq.com", the "game" field indicates that the web page is a web page of a game type. Hence, the scanning module 210 may determine the category of the URL "game.qq.com" according to the keyword of "game" and the category of "game". In this way, the large numbers of browser data stored in the network server are classified quickly and accurately according to the URLs and the category information.

The processing module 230 is configured to obtain a characteristic corresponding to the category by performing a square test for the browser data stored and the category, and obtain a characteristic set of the category and a characteristic vector of the characteristic set according to the characteristic.

The square test, i.e. $x^2$ test, is used to check a correlation between the category and a certain word, so that a word having largest correlation with the category is taken as the characteristic of the category. The characteristic is a most representative word of the category. For example, for a category of "sport", a characteristic may be "basketball". The processing module 230 obtains the characteristic set consists of several characteristics obtained via the square test, and obtains the characteristic vector of the characteristic set according the characteristic and the browser data belonging to the category.

According to another example, since there are large numbers of browser data stored in the network server which are uploaded during procedures of data interaction between various browsers and the network server, the processing module 230 is further to perform word segmentation for the stored browser data to obtain several words and remove stopwords from the obtained words.

According to an example, the processing module 230 firstly performs the word segmentation for the browser data, indicates the browser data as a word set, and removes stopwords from the word set. Specifically, a stopword table may be configured in advance, and the words in the stopword table are removed from the word set. The stopwords include: English characters, numbers, math characters, punctuation and single Chinese character etc. For example, the single Chinese character of Chinese "de" and "le".

Figure 10:
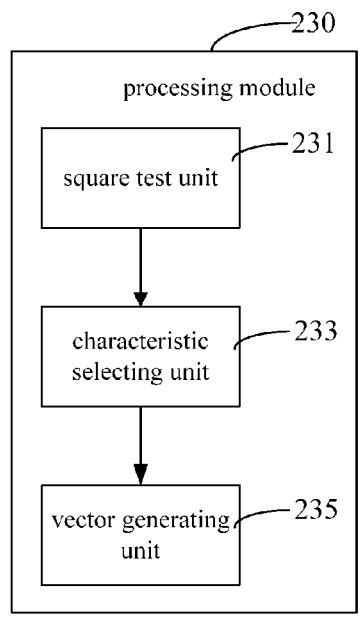
FIG. 10 is a schematic diagram illustrating a processing module according to various examples of the present invention.

As shown in FIG. 10, according to an example, the processing module 230 includes a square test unit 231, a characteristic selecting unit 233 and a vector generating unit 235.

The square test unit 231 is configured to perform the square test for each category and each word in the browser data stored, and to obtain a square value between the word and the category.

According to an example, for each category, the square test unit 231 calculates the square value between the category and each word in the stored browser data respectively. For example, the stored browser data includes N browser data items, and M browser data items are related to sport, and the word "basketball" is included in some of the browser data items, and the procedure of performing the square test for the "sport" and the "basketball" includes: determining the number of browser data items including "basketball" and belonging to the "sport" category in the stored browser data, and representing the determined number as A; determining the number of browser data items including "basketball" and not belonging to the "sport" category in the stored browser data, and representing the determined number as B; determining the number of browser data items not including "basketball" and belonging to the "sport" category in the stored browser data, and the representing the determined number as C; determining the number of browser data items not including "basketball" and not belonging to the "sport" category in the stored browser data, and representing the determined number as D, thus the square value between the category of "sport" and the "basketball" is $$\chi^2(\text{basketball, sport}) = \frac{(AD-BC)^2}{(A+B)(C+D)}.$$

Similarly, the square test unit 231 may obtains the square value between each category and each word.

The characteristic selecting unit 233 is configured to determine whether the square value is greater than a threshold, if the square value is greater than the threshold, take the word as the characteristic of the category, and obtain the characteristic set of the category.

According to the example, the square value indicates the correlation between the word and the category. For each word, if the correlation between the word and a certain category is larger, the category may be distinguished from other categories by using the word. Hence, the threshold is preconfigured and the characteristic selecting unit 233 determines whether the square value is greater than the threshold. If the square value is greater than the threshold, the word is taken as the characteristic of the category; and if the square value is not greater than the threshold, the category cannot be distinguished from other categories by using the word, and the word is not taken as the characteristic of the category.

The vector generating unit 235 is configured to search the browser data corresponding to the category for a word matching the characteristic of the category; and generate the characteristic vector of the characteristic set according to a search result.

According to an example, for a certain category, the vector generating unit 235 takes several words as the characteristics of the category, and the characteristic set consists of the several words.

Figure 11:
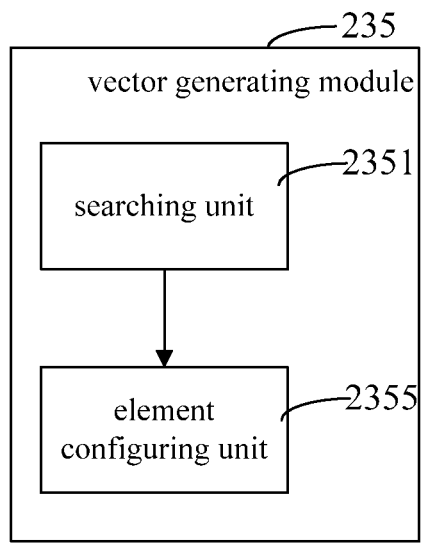
FIG. 11 is a schematic diagram illustrating a vector generating unit according to various examples of the present invention.

As shown in FIG. 11, according to an example, the vector generating module 235 includes a searching unit 2351 and an element configuring unit 2355.

The searching unit 2351 is configured to search the browser data corresponding to the category according to the characteristic of the category; determine whether the browser data corresponding to the category comprises the characteristic of the category; if the browser data corresponding to the category comprises the characteristic of the category, notify the element configuring unit 2355 to configure an element corresponding to the characteristic in the characteristic vector as a preset value; if the browser data corresponding to the category does not comprise the characteristic of the category, notify the element configuring unit 2355 to configure an element corresponding to the characteristic in the characteristic vector as zero.

According to an example, the characteristic and the browser data corresponding to the category are obtained, and the browser data are searched for each characteristic to determine whether the characteristic is included in the browser data. If the characteristic is included in the browser data, the element configuring unit 2355 is notified to configure an element corresponding to the characteristic in the characteristic vector as a preset value, e.g. the preset value may be 1; otherwise, the element configuring unit 2355 is notified to configure an element corresponding to the characteristic in the characteristic vector as 0.

For example, the characteristic set of a certain category is obtained by using the square test, i.e. $T=\{t_1, t_2, \ldots, t_m\}$, the characteristics of the characteristic set are composed of $t_1$, $t_2 \ldots t_m$. Each characteristic is searched in the searching unit 2351 searches the browser data corresponding to the category, and determines that characteristic $t_2$ is not included in the browser data accordingly, so that the characteristic vector of the category is $T_x = \{1, 0, \ldots, 1\}$.

According to another example, the vector generating unit 235 further includes a weight calculating unit. The weight calculating unit is to calculate a weight of each characteristic in the characteristic set corresponding to the category, and replace the preset value in the characteristic vector of the characteristic set with the weight of the characteristic.

According to an example, in the procedure of configuring the value of the element corresponding to the characteristic, each characteristic has the same weightiness in the procedure of classifying the browser data are the same. In some applications, the functions of different characteristics for distinguishing the category corresponding to the characteristic and other categories are different. The browser data may be classified by using only one certain characteristic, or may be classified by using several characteristics together. Hence, the weight of each characteristic is calculated to make the classification more accurate.

Specifically, the vector generating unit 235 calculates a tfidf value of each characteristic according the browser data corresponding to the category by using TF-IDF algorithm, and assigns a weight to each characteristic. The tfidf value is used to evaluate the importance of the characteristic for the browser data of the category, and the tfidf value is increased along with the increase of occurrence times of the characteristic in the browser data.

In the procedure of calculating the tfidf value for each characteristic of the category, the vector generating unit 235 firstly calculates a word frequency $tf_{ij}$ of the characteristic by using a formula $$tf_{ij} = \frac{n_{i,j}}{\sum_K n_{k,j}}.$$

The word frequency is a frequency of the characteristic occurring in the browser data stored in the network server, $n_{i,j}$ represents the number of the characteristic j included in the browser data corresponding to the category i, $n_{k,j}$ represents the number of the characteristic j included in the browser data corresponding to the category k, K represents the total number of the categories; the vector generating unit 235 then calculates an inverse document frequency $idf_j$ i.e. a reciprocal of a document frequency of the characteristic by using a formula $$idf_i = \log\left(\frac{|D|}{|\{j: t_i \in d_j\}|}\right).$$

The document frequency is a ratio of the number of categories corresponding to the browser data including the characteristic to the total number of the categories; D represents the total number of the categories, |{j:t_i∈d_j}| represents the number of categories corresponding to the browser data $t_i$ including the characteristic j; $d_j$ represents all browser data stored in the network server; finally, the vector generating unit 235 calculates a product of the word frequency $tf_{i,j}$ and the inverse document frequency $idf_i$ to obtain the $tfidf_{i,j}$ value of the characteristic, i.e. $tfidf_{i,j}=tf_{i,j}\times ifd_i$.

The probability calculating module 250 is configured to obtain a posterior probability corresponding to the characteristic in the characteristic set by performing probability calculation for the characteristic set of the category.

According to an example, the probability calculating module 250 calculates a prior probability and a conditional probability of the characteristic according to a naive Bayesian formula, and obtains the posterior probability of the characteristic by multiplying the prior probability and the conditional probability. Specifically, the prior probability may be obtained according to a formula $$P(Y = c_k) = \frac{n_k}{\sum_k n_k},$$

$n_k$ represents the number of browser data items in the browser data corresponding to the category $c_k$, K represents the number of all categories, k∈K. Then the conditional probability of the characteristic $x^{(j)}$ may be obtained according to a formula $$P(X^{(j)} = x^{(j)} | Y = c_k) = \frac{n_{jk}}{\sum_K n_{jk}},$$

$n_{jk}$ represents the number of the characteristic $x^{(j)}$ included in the browser data corresponding to the category $c_k$. Finally the posterior probability of the characteristic is obtained by multiplying the prior probability and the conditional probability.

The module establishing module 270 is configured to establish a classification model according to the category, the characteristic set of the category, the characteristic vector of the characteristic set and the posterior probability corresponding to the characteristic in the characteristic set.

According to an example, for each category, the module establishing module 270 stores the obtained characteristic set, the characteristic vector and the posterior probability corresponding to the characteristic in the characteristic set and associates them with the category to form the classifying model, and the browser data uploaded by the browser are classified accurately according to the classifying model.

Figure 12:
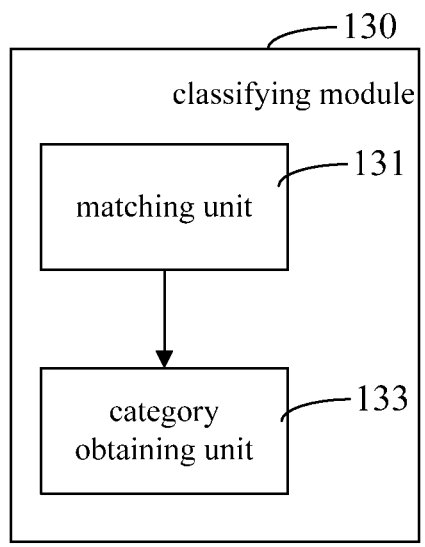
FIG. 12 is a schematic diagram illustrating a classifying module according to various examples of the present invention.

As shown in FIG. 12, according to an example, the classifying module 130 includes a matching unit 131 and a category obtaining unit 133.

The matching unit 131 is configured to calculate a match degree between the browser data uploaded and each of the characteristic sets; and select a highest match degree in the match degrees calculated.

According to an example, the match degree is configured to indicate the degree of similarity between the uploaded browser data and the characteristic set of a certain category, when the match degree is higher, the possibility of that the uploaded browser data belongs to the category is higher.

The matching unit 131 extracts a word in the uploaded browser data, compares the extracted word with the characteristics in each characteristic set to obtain the characteristics identical with the extracted word in each characteristic set, and then the matching unit 131 obtains the matching degree between the uploaded browser data the characteristic set according to the weight and the posterior possibility corresponding the characteristic, and further obtains the highest match degree. In this way, the most similar characteristic set of the uploaded browser data is obtained without a large number of complex calculations, thereby greatly reducing the resources burden for the numerous uploaded browser data.

For example, the matching unit 131 extracts several words in the uploaded browser data, compares the extracted words with the characteristics in each characteristic set to obtain the characteristics identical with the extracted word in each characteristic set. Then the matching unit 131 calculates the product of the weight and the posterior possibility corresponding each of the obtained characteristics, and multiply the multiple products to obtain the matching degree between the uploaded browser data the characteristic set, and extracts the highest match degree in the calculated match degrees.

The category obtaining unit 133 is configured to obtain the characteristic set corresponding to the highest match degree and obtain the category corresponding to the characteristic set; and determine the category obtained as the category of the browser data uploaded.

According to an example, since the characteristic set corresponding to the highest match degree is most similar with the uploaded browser data, the category of the characteristic set is the category of the uploaded browser data.

Figure 13:
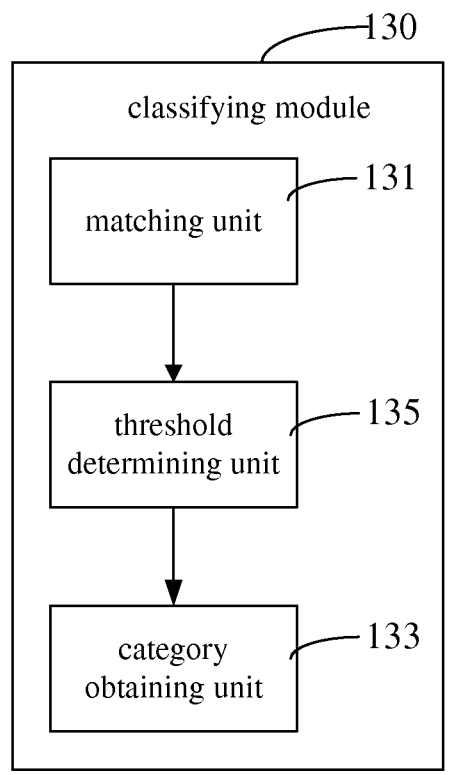
FIG. 13 is a schematic diagram illustrating a classifying module according to various examples of the present invention.

As shown in FIG. 13, according to another example, the classifying module 130 further includes a threshold determining unit 135.

The threshold determining unit 135 is configured to determine whether the highest match degree is greater than a match threshold; if the highest match degree is greater than the match threshold, notify the category obtaining unit 133; if the highest match degree is greater than the match threshold, the processing is terminated.

According to the example, the characteristic set corresponding to the highest match degree is most similar with the uploaded browser data. In some situations, the classifying model cannot determine the category of the uploaded browser data. Therefore, after the highest match degree is obtained, the threshold determining unit 135 determines whether the highest match degree is greater than the match threshold; if the highest match degree is greater than the match threshold, the category of the characteristic set corresponding to the highest match degree is the category of the uploaded browser data; if the highest match degree is not greater than the match threshold, it is indicated that the classifying model cannot determine the category of the uploaded browser data, thereby further improving the accuracy of the classification.

Figure 14:
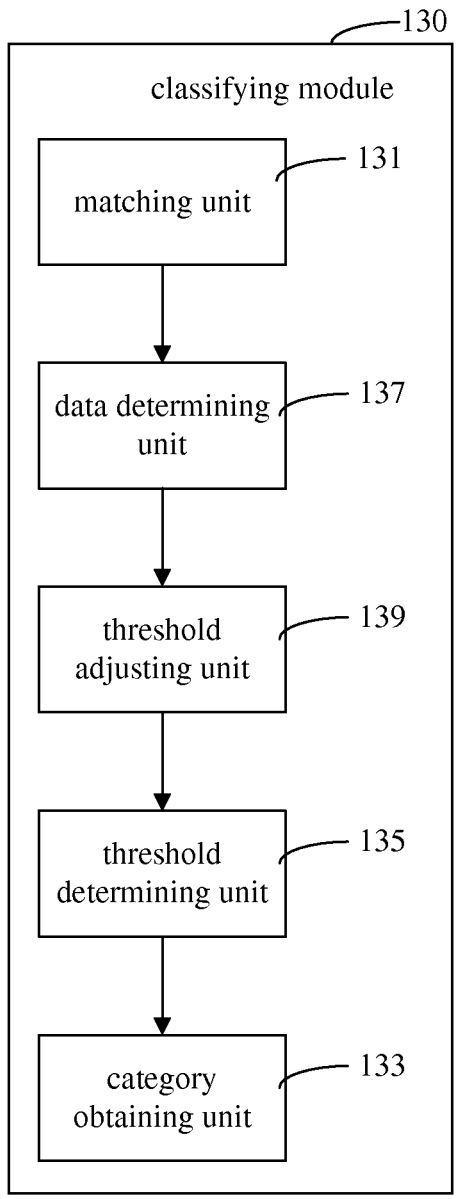
FIG. 14 is a schematic diagram illustrating a classifying module according to various examples of the present invention.

As shown in FIG. 14, according to another example, the classifying module 130 further includes a data determining unit 137 and a threshold adjusting unit 139.

The data determining unit 137 is configured to determine whether a network address recorded in the browser data uploaded is comprised in the browser data stored; if the network address recorded in the browser data uploaded is comprised in the browser data stored, notify the threshold adjusting unit 139 to reduce the preset match threshold; if the network address recorded in the browser data uploaded is comprised in the browser data stored, notify the threshold adjusting unit 139 to determine the number of the characteristics comprised in the browser data uploaded and adjust the preset match threshold according to the determined number.

According to an example, the match threshold may be adjusted according practical conditions to adapt the current classifying procedure. The data determining unit 137 extracts the URL from the uploaded browser data and it is determined whether the URL is included in the stored browser data. If the URL is included in the stored browser data, the possibility of identifying the uploaded browser data is respectively high, and thus the threshold adjusting unit 139 is notified to reduce the match threshold; otherwise, the threshold adjusting unit 139 is notified to adjust the match threshold according the number of the characteristics included in the uploaded browser data, so that the match threshold may be used to classify various browser data, and the accuracy of the classification is improved.

According to an example, the threshold adjusting unit 139 may obtain the reduced match threshold is obtained according to $\theta=\theta/10$.

According to an example, no matter whether the URL recorded in the uploaded browser data is included in the stored browser data, the number of the characteristics included in the uploaded browser data is considered to determine a reasonable match threshold and dynamically adjust the match threshold. The threshold adjusting unit 139 determines the number of the characteristics which is included in both the characteristic set corresponding to the highest match degree and the uploaded browser data, and the match threshold is adjusted according a formula $\theta=\theta/l*m$, l is an adjusting factor.

According to the method and apparatus for pushing the network information, browser data uploaded by a browser are obtained, the browser data uploaded are classified via a classification model and a category of the browser data is determined; network information related to the category is obtained and pushed to the browser. Since the browser data is generated when the user triggers various operations via the browser, the browser data reflects the intention of the user, so that the network information satisfying the intention of the user is obtained according to the browser data.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in storage in an extension board inserted in the computer or in storage in an extension unit connected to the computer. In this example, a CPU in the extension board or the extension unit executes at least part of the operations according to the instructions based on the program codes to realize a technical scheme of any of the above examples.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method for pushing network information, comprising:
   obtaining, by a server, browser data uploaded by a browser;
   classifying, by the server, the browser data uploaded via a classification model and determining a category of the browser data;
   obtaining, by the server, network information related to the category, and pushing the network information obtained to the browser;
   before the procedure of classifying the browser data uploaded via a classification model and obtaining a category of the browser data, further comprising:
   scanning, by the server, browser data stored according to preset category information and obtaining a category of the browser data stored;
   performing, by the server, a square test for each category and each word stored in the browser data, and obtaining a square value between the word and the category;
   determining, by the server, whether the square value is greater than a threshold, if the square value is greater than the threshold, taking the word as a characteristic of the category, and obtaining a characteristic set of the category;
   searching, by the server, the browser data corresponding to the category according to the characteristic of the category;
   determining, by the server, whether the browser data corresponding to the category comprises the characteristic of the category;
   if the browser data corresponding to the category comprises the characteristic of the category, configuring, by the server, an element corresponding to the characteristic in a characteristic vector of the characteristic set as a preset value;
   if the browser data corresponding to the category does not comprise the characteristic of the category, configuring, by the server, an element corresponding to the characteristic in the characteristic vector of the characteristic set as zero;
   obtaining, by the server, a posterior probability corresponding to the characteristic in the characteristic set by performing probability calculation for the characteristic set of the category;

establishing, by the server, a classification model according to the category, the characteristic set of the category, the characteristic vector of the characteristic set and the posterior probability corresponding to the characteristic in the characteristic set.

2. The method of claim 1, after configuring the element corresponding to the characteristic in the characteristic vector as the preset value, further comprising:
calculating, by the server, a weight of each characteristic in the characteristic set corresponding to the category, and replacing the preset value in the characteristic vector of the characteristic set with the weight of the characteristic.

3. The method of claim 1, wherein classifying the browser data uploaded via a classification model and obtaining the category of the browser data comprises:
calculating, by the server, a match degree between the browser data uploaded and each of the characteristic sets; and selecting a highest match degree in the match degrees calculated;
obtaining, by the server, the characteristic set corresponding to the highest match degree; and obtaining the category corresponding to the characteristic set; and determining the category obtained as the category of the browser data uploaded.

4. The method of claim 3, before obtaining the characteristic set corresponding to the highest match degree, obtaining the category corresponding to the characteristic set, and determining the category obtained as the category of the browser data uploaded comprises:
determining, by the server, whether the highest match degree is greater than a match threshold;
if the highest match degree is greater than the match threshold, obtaining the characteristic set corresponding to the highest match degree; obtaining the category corresponding to the characteristic set; and determining the category obtained as the category of the browser data uploaded.

5. The method of claim 4, before determining whether the highest match degree is greater than the match threshold, further comprising:
determining, by the server, whether a URL recorded in the browser data uploaded is comprised in the browser data stored;
if the URL recorded in the browser data uploaded is comprised in the browser data stored, reducing the preset match threshold; if the URL recorded in the browser data uploaded is not comprised in the browser data stored, determining the number of the characteristics comprised in the browser data uploaded, and adjusting the preset match threshold according to the determined number.

6. An apparatus for pushing network information, comprising:
a processor for executing instructions stored in a memory, the instructions comprise:
a data obtaining instruction, to obtain browser data uploaded by a browser;
a classifying instruction, to classify the browser data uploaded via a classification model and obtain a category of the browser data; and
a push instruction, to obtain network information related to the category, and push the network information obtained to the browser;
wherein the instructions further comprise:
a scanning instruction, to scan browser data stored according to preset category information and obtain a category of the browser data stored;
a processing instruction, to obtain a characteristic corresponding to the category by performing a square test for the browser data stored and the category, and obtain a characteristic set of the category and a characteristic vector of the characteristic set according to the characteristic;
a probability calculating instruction, to obtain a posterior probability corresponding to the characteristic in the characteristic set by performing probability calculation for the characteristic set of the category;
a module establishing instruction, to establish a classification model according to the category, the characteristic set of the category, the characteristic vector of the characteristic set and the posterior probability corresponding to the characteristic in the characteristic set,
wherein the processing instruction comprises:
a square test instruction, to perform the square test for each category and each word in the browser data stored, and obtain a square value between the word and the category;
a characteristic selecting instruction, to determine whether the square value is greater than a threshold; if the square value is greater than the threshold, take the word as the characteristic of the category, and obtain the characteristic set of the category;
a vector generating instruction, to search the browser data corresponding to the category for a word matching the characteristic of the category; and generate the characteristic vector of the characteristic set according to a search result;
the vector generating instruction comprises:
a searching instruction, to search the browser data corresponding to the category according to the characteristic of the category; determine whether the browser data corresponding to the category comprises the characteristic of the category; if the browser data corresponding to the category comprises the characteristic of the category, notify an element configuring unit to configure an element corresponding to the characteristic in the characteristic vector as a preset value; if the browser data corresponding to the category does not comprise the characteristic of the category, notify an element configuring unit to configure an element corresponding to the characteristic in the characteristic vector as zero.

7. The apparatus of claim 6, wherein the vector generating instruction further comprises:
a weight calculating instruction, to calculate a weight of each characteristic in the characteristic set corresponding to the category, and replace the preset value in the characteristic vector of the characteristic set with the weight of the characteristic.

8. The apparatus of claim 6, wherein the classifying instruction comprises:
a matching instruction, to calculate a match degree between the browser data uploaded and each of the characteristic sets; and select a highest match degree in the match degrees calculated;
a category obtaining instruction, to obtain the characteristic set corresponding to the highest match degree; and obtain the category corresponding to the characteristic set; and determine the category obtained as the category of the browser data uploaded.

9. The apparatus of claim 8, wherein the classifying instruction further comprises:
a threshold determining instruction, to determine whether the highest match degree is greater than a match threshold; if the highest match degree is greater than the match threshold, notify the category obtaining unit.

10. The apparatus of claim 9, wherein the classifying instruction further comprises:
a data determining instruction, to determine whether a network address recorded in the browser data uploaded is comprised in the browser data stored; if the network address recorded in the browser data uploaded is comprised in the browser data stored, notify a threshold adjusting unit to reduce the preset match threshold; wherein
the threshold adjusting instruction is further to determine the number of the characteristics comprised in the browser data uploaded, and adjust the preset match threshold according to the determined number.

* * * * *